（12）United States Patent
Eidson et al.

(10) Patent No.: US 6,697,626 B1
(45) Date of Patent: Feb. 24, 2004

(54) USING CHANNEL LOADING STATISTICS TO DETERMINE WHETHER TO SEARCH FOR A NEW CHANNEL IN A WIRELESS COMMUNICATION SYSTEM

(75) Inventors: Donald B. Eidson, San Diego, CA (US); William R. Flores, San Marcos, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 09/201,076

(22) Filed: Nov. 30, 1998

(51) Int. Cl.$^7$ ................................................. H04Q 7/20
(52) U.S. Cl. .................. 455/452; 450/453; 450/436
(58) Field of Search ................................. 455/453, 452, 455/450, 451, 509, 513, 516, 423, 424, 425, 436; 370/485, 329

(56) References Cited

U.S. PATENT DOCUMENTS 5,535,425 A * 7/1996 Watanabe .................... 455/436
5,887,263 A * 3/1999 Ishii ............................. 455/452
6,044,090 A * 3/2000 Grau et al. .................... 370/485
6,052,596 A * 4/2000 Barnickel ..................... 455/450

OTHER PUBLICATIONS

Barnickle, "System and Method for Dynamic Channel Assignment", US Patent Application 08/820,513, filed Mar. 19, 1997.*

* cited by examiner

Primary Examiner—Nguyen T. Vo
Assistant Examiner—Erika A. Gary
(74) Attorney, Agent, or Firm—Christopher J. Rourk; Akin Gump Strauss Hauer & Feld LLP

(57) ABSTRACT

Channel loading statistics are collected to allow a wireless transceiver communicating on one channel to make an educated decision about whether to seek another channel when interference occurs. All of the available channels are monitored to determine whether any of the channels are idle, and data about the idle channels is accumulated. The transceiver can use the accumulated data to determine whether any of the channels are idle at any given time. The transceiver is allowed to seek another channel if the data indicates that the transceiver is likely to find an idle channel, e.g., if a Gaussian statistical analysis of the data indicates with a given level of confidence that more than a given number of channels will be idle.

22 Claims, 5 Drawing Sheets

EXAMPLE: N = 100 CHANNELS

| NOISE FLOOR (dBm) | -105 | -95 | -87 | -80 | -73 |
|---|---|---|---|---|---|
| # IDLE CHANNELS | 0 | 1 | 23 | 50 | 81 |

USING CHANNEL LOADING STATISTICS TO DETERMINE WHETHER TO SEARCH FOR A NEW CHANNEL IN A WIRELESS COMMUNICATION SYSTEM

CROSS REFERENCE TO RELATED APPLICATIONS

This application is related to, and incorporates by reference, U.S. application Ser. No. 09/163,972, filed on Sep. 30, 1998, by Donald Brian Eidson and William Richard Flores and entitled "Anticipating Interference From a Potentially Interfering Transmitter in a Wireless Communication System."

TECHNICAL FIELD

The invention relates to wireless communication systems and, more particularly, to using channel loading statistics to determine whether to search for a new channel in a wireless communication system.

BACKGROUND

Wireless communication systems allow remote and often portable transceiving devices, e.g., radio telephones ("mobile stations"), to communicate with each other and with stationary transceiving devices, e.g., cellular stations ("fixed stations") over great distances. FIG. 1 shows a typical wireless network 10, in which several mobile units 12, 14, 16 communicate with two fixed stations 18, 20. The fixed stations 18, 20 communicate with each other, e.g., via radio frequency (RF) signals 22 or via a public switching telephone network 24 (PSTN).

Many wireless networks, including cellular networks such as the Personal Handyphone System (PHS) networks in Japan and the Digital European Cordless Telephone (DECT) networks in Europe, utilize dynamic channel assignment, through which fixed stations with overlapping coverage areas use and reuse preassigned channels. In some systems, such as PHS, the mobile and fixed units employ time division multiple access (TDMA) and/or time division duplex (TDD) communication, which allows each fixed station to communicate with multiple mobile units during a given transmit/receive frame. Each transmit/receive frame may include several discrete time slots, each dedicated to transmitting information between a fixed station and a particular mobile unit.

The fixed stations in many TDMA/TDD-based networks, including PHS networks, may be either public or private. In general, a public fixed station may be accessed by any mobile unit within its range, and a private fixed station may be accessed only by mobile units assigned to it. While public fixed stations typically operate under the control of synchronized internal clocks, the clocks in private fixed stations typically are not synchronized. Moreover, the clocks in private PHS fixed stations are required to be accurate only to 5 ppm; over time the clocks in private fixed stations tend to drift with respect to one another. Because a virtually limitless number of PHS mobile units and fixed stations may exist within a given geographic area, and because PHS networks use Dynamic Channel Assignment, private fixed stations are subject to great variations in the interference they experience from other fixed stations. For example, a carrier that presents relatively little interference when first selected by a fixed station may become too noisy for adequate communication when another fixed station suddenly switches to the carrier or as the transmit/receive frames of other transceivers gradually drift onto each other.

SUMMARY

The invention allows the accumulation of channel loading statistics from which a transceiver communicating on one channel can determine whether it should seek another channel, such as when interference arises on the first channel. The transceiver monitors all of the available channels to determine whether any of the channels are idle and accumulates data about the idle channels. The transceiver can use the accumulated data to determine whether any of the channels are idle at any given time. The transceiver is allowed to seek another channel if the data indicates that the transceiver is likely to find an idle channel.

In some embodiments, the transceiver seeks another channel if it determines with a given level of confidence that more than a given number of channels are likely to be idle. The transceiver can determine whether any of the available channels are idle by determining which of the channels has a noise floor level below a given threshold level. In many embodiments, the transceiver compares the noise floor level of each channel to multiple threshold levels to provide several noise levels at which the channel can be considered "idle." The data accumulated by the transceiver may indicate, for each threshold level, how many of the channels have noise and interference floor levels (hereinafter "noise floors") below the threshold level. The transceiver also may compile information indicating an average number of channels over a given time period (e.g., 15 minutes) that have a noise floor level below the given threshold level. The transceiver then can apply Gaussian statistical analysis to calculate a minimum value for the average number that ensures with a given level of confidence that more than a given number of channels are idle at any given time. For example, the transceiver can use Gaussian statistical analysis to determine that in a network having 100 channels, at least ten channels on average must be idle to ensure with 99.9% confidence that more than one channel will be idle at any given time. In many embodiments, the transceiver begins searching for another channel only if the data indicates that the average number of idle channels is at least as great as the minimum value.

Many advantages result from the invention. For example, a wireless transceiver may, upon experiencing interference from another transceiver, make an educated decision to seek another channel based on use patterns of the available channels. Since seeking a new channel takes time and can degrade call quality, the transceiver can avoid a futile channel search if it is likely not to find an idle channel. As a result, the invention can lead to increased system efficiency and improved call quality.

The details of one or more embodiments of the invention are set forth in the accompanying drawings and the description below. Other features, objects, and advantages will be apparent from the description, the drawings, and the claims.

DESCRIPTION OF DRAWINGS

Like reference numbers and designations in the various drawings indicate like elements.

DETAILED DESCRIPTION

Figure 1:
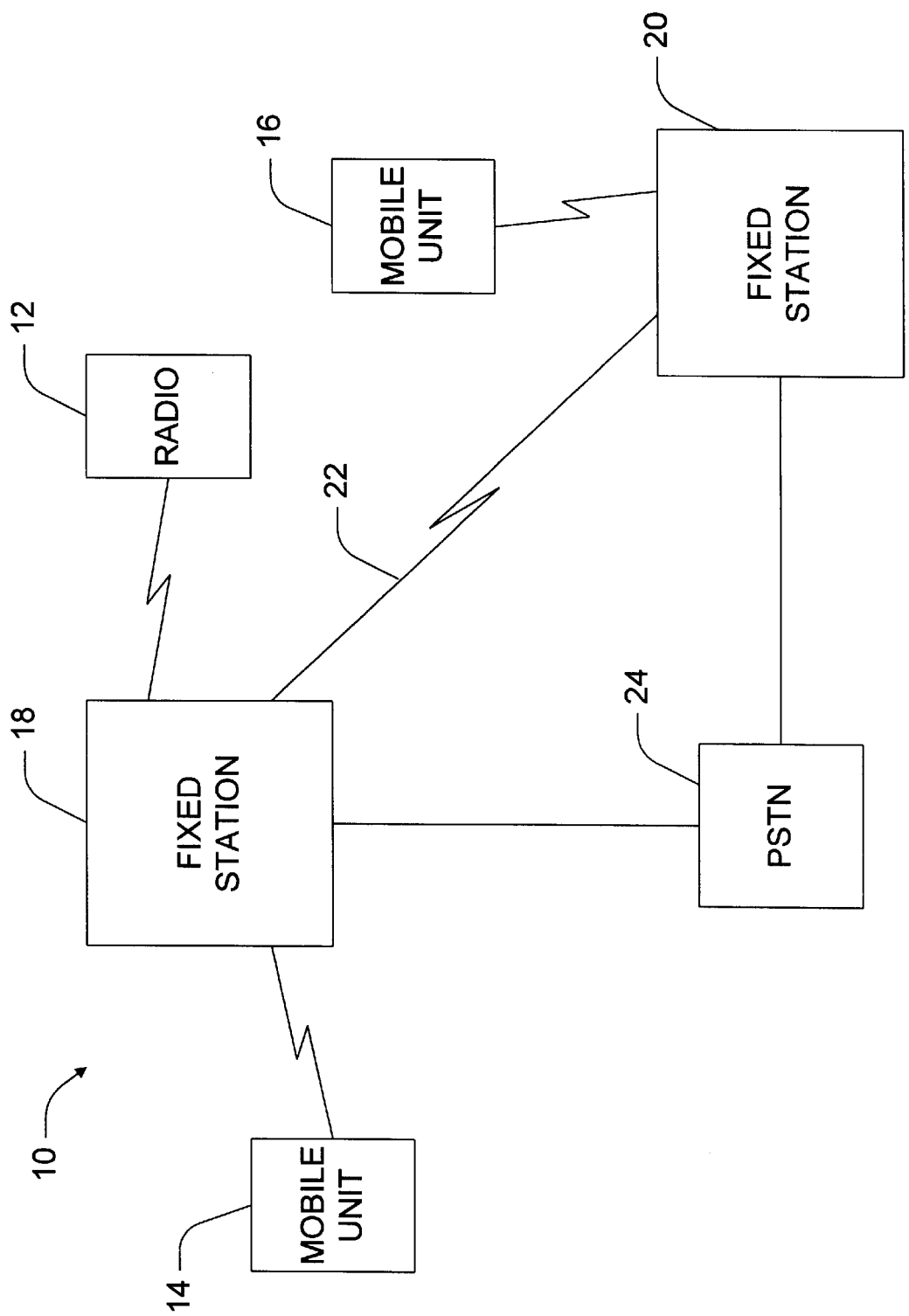
FIG. 1 is a block diagram of a wireless network.
Figures 2, 4:
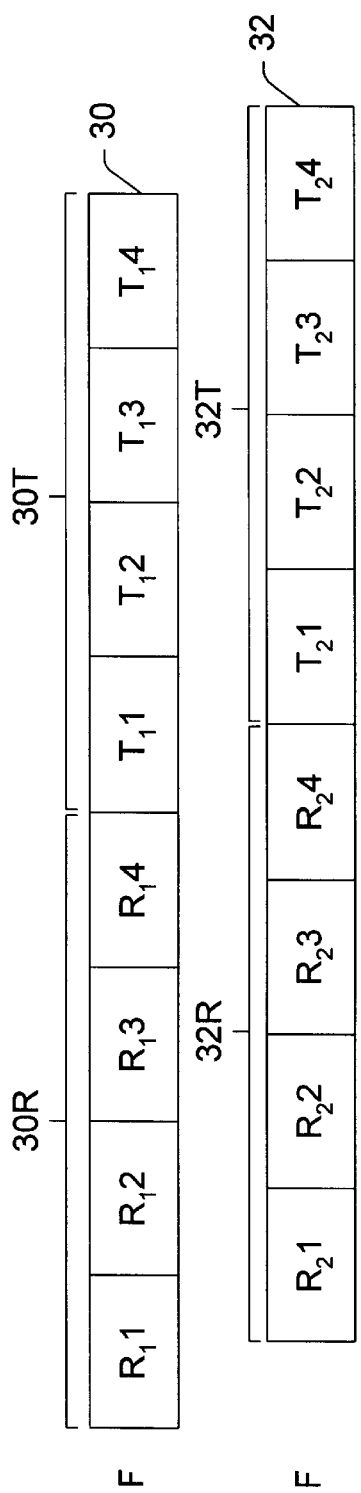
FIG. 2 shows interfering transmit/receive frames for two transmitters on the same carrier frequency in a slotted TDMA/TDD network.
FIG. 4 is an example of a table stored by the transceiver to collect channel loading statistics.

FIG. 2 shows one transmit/receive frame 30, 32 for each of two interfering TDMA/TDD-based transceivers (either fixed or mobile stations) operating on the same carrier frequency F. Each transmit/receive frame 30, 32 includes eight time slots of equal duration, the first four of which are receive slots 30R, 32R dedicated to receiving information from mobile units, and the last four of which are transmit slots 30T, 32T dedicated to transmitting information to the mobile units. Each fixed station can, and often does, communicate with more than one mobile unit during each transmit/receive frame 30, 32 by assigning each mobile unit at least one time slot in both the receive portion 30R, 32R and the transmit portion 30T, 32T of the transmit/receive frame 30, 32. In general, the receive slot(s) and the transmit slot(s) assigned to any given mobile unit occur at the same position in the receive portion and the transmit portion, respectively, of the transmit/receive frame. For example, a fixed station may communicate with up to four different mobile units during a given transmit/receive frame 30 by assigning slots $R_1 1$ and $T_1 1$ to the first mobile unit, slots $R_1 2$ and $T_1 2$ to the second mobile unit, slots $R_1 3$ and $T_1 3$ to the third mobile unit, and slots $R_1 4$ and $T_1 4$ to the fourth mobile unit. The fixed station may communicate with fewer than four mobile units during a transmit/receive frame by assigning multiple slots in both the transmit and receive portions to one mobile unit or by leaving slots unassigned.

When multiple fixed stations communicate on the same carrier frequency F, the transmit/receive frames 30, 32 may overlap to the point that one or more of the fixed or mobile stations cannot achieve acceptable signal quality during communication with certain mobile units. In this situation, one of the stations and any affected mobile units can avoid the interference by switching to another channel to continue communication. However, channel searching may be so time-consuming that the channel search unacceptably degrades communication quality. Moreover, in periods of high call volume, the channel search may not lead to another channel with a more acceptable interference level.

Figure 3:
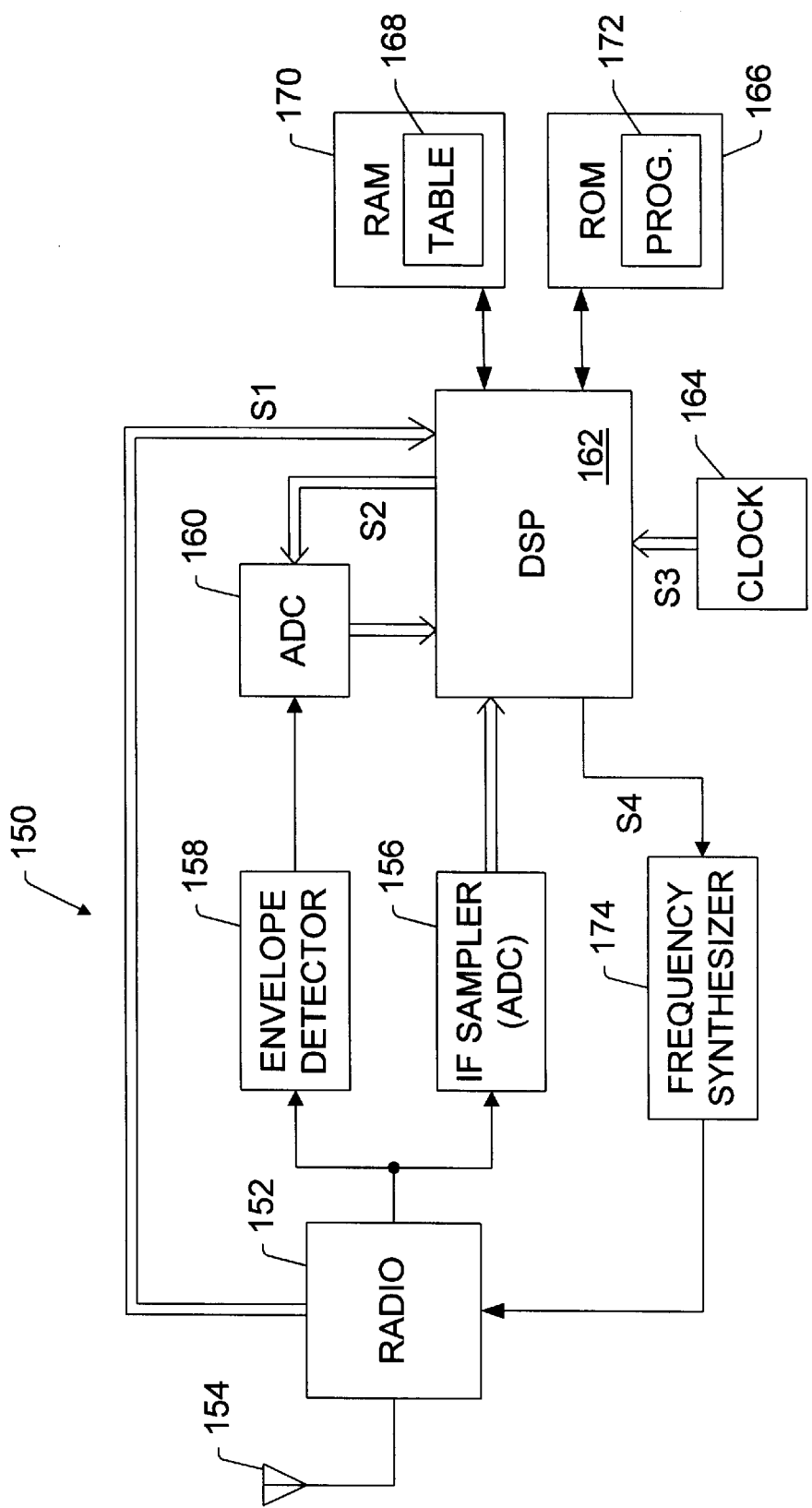
FIG. 3 is a functional block diagram of a transceiver configured to maintain channel loading statistics.

FIG. 3 is a partial schematic diagram of a transceiver that monitors the channels in a wireless network and maintains cumulative statistics about activity on the channels. These statistics are used, for example, to indicate the likelihood at any given moment that the transceiver will be able to find an available channel reasonably quickly. The transceiver includes, among other things, an intermediate frequency (IF) sampling receiver 150 having a radio 152 that receives an incoming radio frequency (RF) signal via an RF antenna 154. The radio 152 down converts the RF signal to IF and delivers the IF signal to an IF sampler 156 and to an envelope detector 158. An analog-to-digital converter (ADC) 160 samples the detected envelope. A digital signal processing (DSP) circuit 162 receives the sampled IF signal and the sampled envelope and determines the strength of the received signal. The radio provides an automatic gain control (AGC) signal S1 to the DSP circuit 162, which itself provides a sampling control signal S2 to the ADC 160. A clocking circuit 164 provides a timing signal S3 to the DSP circuit 162.

The DSP circuit 162 may include programmable control circuitry that executes instructions in a program 172 stored in an electronic storage device 166, such as a hard disk or read only memory (ROM). The program 172 enables the DSP circuit 162 to gather and accumulate carrier loading statistics. The statistics may be accumulated in a table 168, described below, that is stored in a dynamic storage device 170, such as random access memory (RAM). The program 172 also allows the DSP circuit 162 to decide whether to search for another channel and/or carrier frequency when the transceiver begins experiencing interference, as described below. The DSP circuit 162 issues a control signal S4 that instructs a frequency synthesizer 174 to tune to an idle carrier when one is available.

FIG. 4 shows an example of a table that the transceiver may use to store cumulative statistics about channel availability, as inferred from carrier metrics. Instead of maintaining information about each channel individually, the transmitting unit identifies how many channels are available (or "idle") at each of several preselected noise floor levels. The noise floor levels may be fixed permanently, in read-only memory for example, or they may be user-programmable. For example, the user may select five noise floor levels (−105 dBm, −95 dBm, −87 dBm, −80 dBm, and −73 dBm) at which to test the availability of the channels in the network. The transceiver considers the signal-to-noise quality of each channel to be only as good as the lowest quality encountered during a sampling pass of that channel.

During periods in which the transceiver is not processing calls, the unit scans the channels and determines how many meet each of the five noise floor thresholds. The unit then stores, for each of the five noise floor levels, a single number indicating how many "idle" channels it found, that is, how many of the channels have a noise floor at or below the threshold level. As described below, the transmitting unit can maintain a cumulative average of the number of idle channels at each noise floor level. In this example, the average number of idle channels at each of the five preselected noise floor levels is zero for −105 dBm, one for −95 dBm, twenty-three for −87 dBm, fifty for −80 dBm, and eighty-one for −73 dBm. The transmitting unit also stores a constant value ($C_{THRESH}$), discussed below, that indicates the minimum number of idle channels that must exist at a given noise floor level before the transmitting unit will attempt to switch channels during communication.

Figure 5:
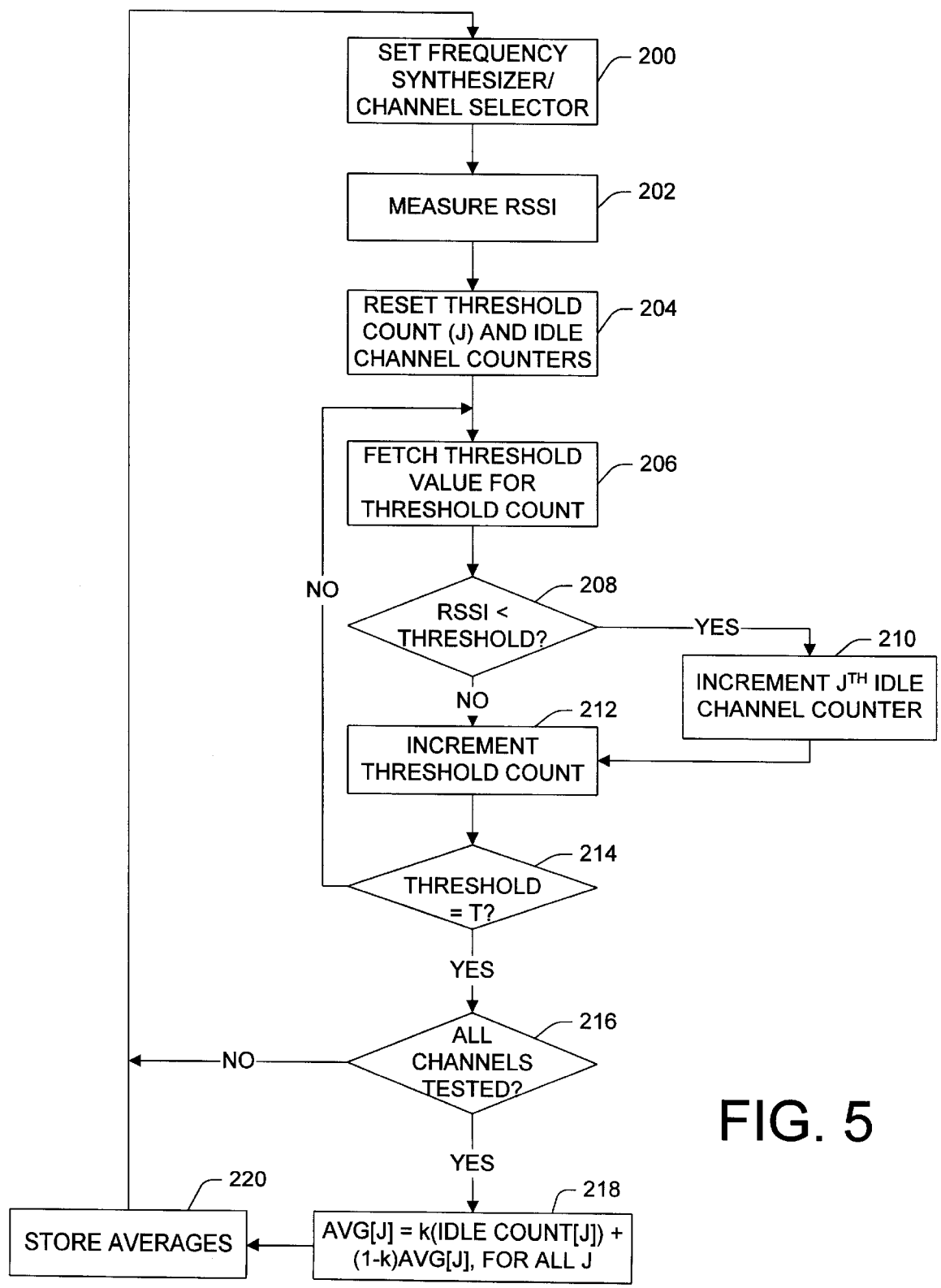
FIG. 5 is a flow chart for a routine by which the transmitting unit collects the statistics.

FIG. 5 is a flow chart for a routine that allows the transceiver to collect the channel loading statistics. The transmitting unit enters and repeats this routine as long as the unit is not processing an active call with another unit or, for a base station that can process multiple calls at once, as long as the station has resources to collect the statistics. The transceiver can be configured to track its progress through the routine so that it can resume the routine at the last completed step when the routine is interrupted for any reason.

Upon entering the routine, the transceiver tunes itself to a selected channel (step 200) and measures the received signal strength (RSSI) on that channel (step 202). The transceiver then initializes a "threshold level count" variable "j" to a value of zero (step 204). This variable indicates which of the T noise floor levels the unit currently is comparing the measured RSSI against, where T is an integer (five in the example above). The unit then retrieves the threshold value (in dBm) associated with the current noise floor level (step 206) and compares the measured RSSI to the threshold value (step 208). If the measured RSSI is below the threshold value, the channel is considered to be "idle" at that threshold level, and a corresponding "idle channels count" variable is incremented (step 210). The "idle channels count" variable indicates how many channels have a noise floor level at or below the current threshold value. The transceiver then increments the threshold count variable (step 212) and compares this variable to the constant T (step 214). If the threshold count variable is less than T, the transceiver retrieves the threshold value associated with the next preselected noise floor level (step 206) and determines whether the measured RSSI at the current channel is below that threshold value. Once the transceiver has compared the measured RSSI to all of the threshold levels, the transceiver determines whether it has measured the noise floors for all channels (step 216). If not, the transceiver tunes itself to the next channel (step 200) and repeats the steps above.

When the transceiver has tested all of the channels at all of the preselected noise floor levels, the transceiver updates a running average of the number of idle channels for each noise floor level (step 218), according to the following equation:

$$avg[j]=k\cdot(\text{idle count})+(1-k)\cdot avg[j],$$

In this equation, avg[j] is the running average of the idle channel count for the $j^{th}$ noise floor level; j identifies the given noise floor level (j=0 to T−1); and k is a weighting constant, typically having a value such as 1/256 or 1/1028. The value of the weighting constant is chosen so that the average is calculated over a relatively long time period (e.g., 15 minutes) to ensure meaningful traffic statistics. The transmitting unit then stores the average values at the appropriate locations in the table, replacing the previous values (step 220), and tunes itself to the first channel (step 200) to repeat the statistics-gathering process.

Figure 6:
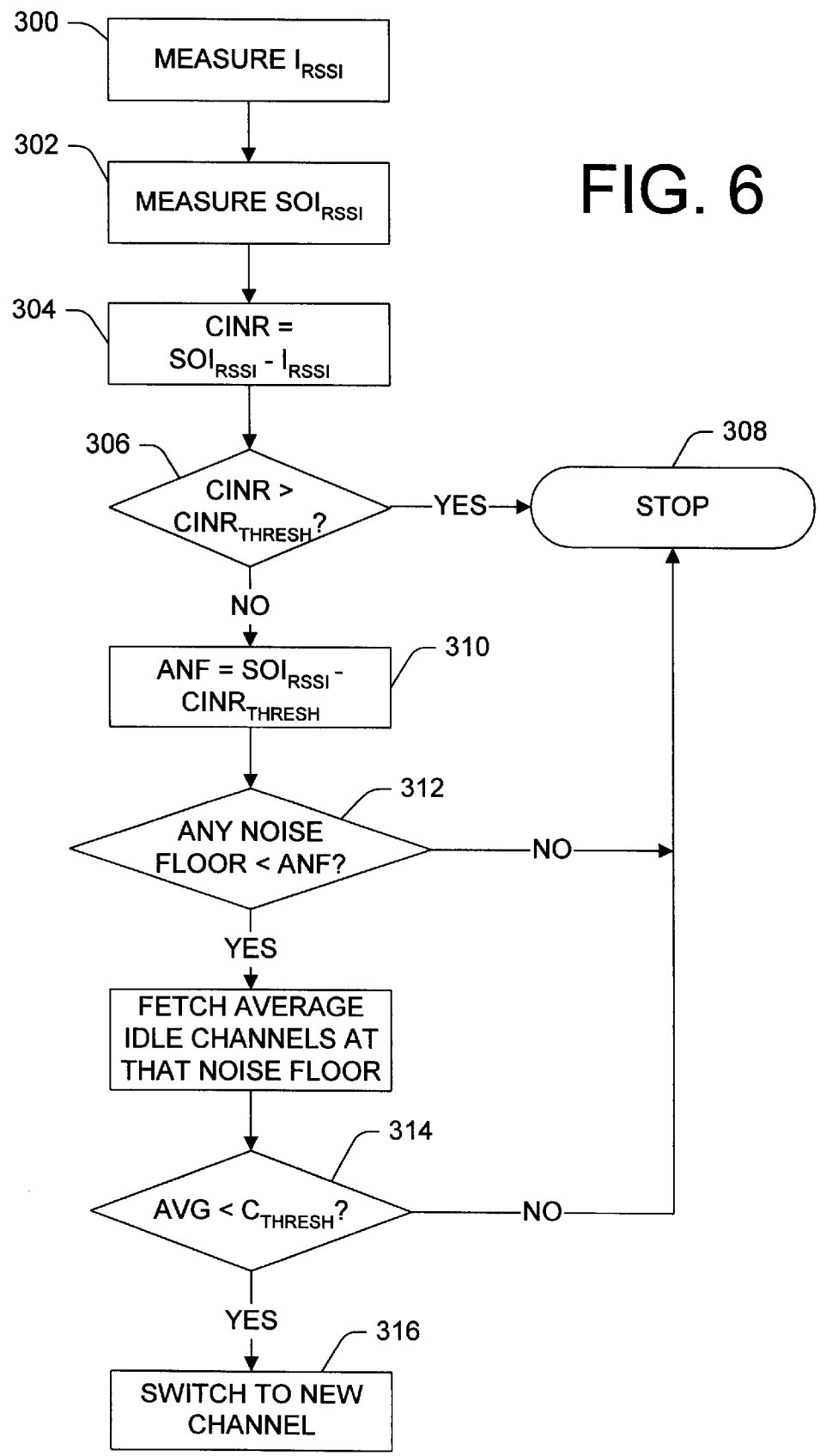
FIG. 6 is a flow chart for a routine by which the transmitting unit may use the stored statistics to determine whether to switch channels during an active call.

FIG. 6 is a flow chart for a routine that allows the transceiver to decide whether to search for a new channel during an active call. The transceiver begins by measuring the received signal strength on the active channel at a time during which the transceiver is not sending or receiving a burst of information (step 300). The RSSI measured at this time indicates the interference level ($I_{RSSI}$) of the channel during the active call. The transceiver then measures the received signal strength ($SOI_{RSSI}$) of the signal-of-interest during a burst portion of the active call (step 302) and calculates the carrier-to-interference noise ratio (CINR) (step 304). One method of determining CINR in a slot-based TDMA/TDD network is described in the co-pending U.S. application Ser. No. 09/163,972.

Upon obtaining the CINR for the active call, the transceiver determines whether the CINR exceeds a predetermined threshold value ($CINR_{THRESH}$), a constant which may be stored permanently e.g., in ROM, or stored dynamically, e.g., in RAM (step 306). The threshold value $CINR_{THRESH}$ is typically large enough to ensure a minimum acceptable communication quality level during the active call (e.g., 15 to 17 dB). If the CINR exceeds the threshold value, the transceiver does not attempt to switch channels (step 308).

If the CINR does not exceed the threshold $CINR_{THRESH}$, the transceiver examines the noise-floor values associated with each of the T noise floor levels, looking for an acceptable noise floor (ANF) that would provide a CINR that would meet or exceed $CINR_{THRESH}$. The transceiver determines the acceptable noise floor ANF by subtracting $CINR_{THRESH}$ from $SOI_{RSSI}$ (step 310). The transceiver then compares each of the T noise floor levels to the acceptable noise floor level ANF to determine whether any of the T noise floor levels is below the acceptable level ANF (step 312). For each noise floor level below ANF, the average number of idle channels (AVG) at or below this noise floor level provides a measure of the confidence that another channel will provide a CINR that exceeds the threshold $CINR_{THRESH}$. The transceiver then determines whether the average value AVG meets or exceeds a constant $C_{THRESH}$, described below (step 314). If so, the transceiver is "acceptably" confident of finding a better channel and therefore begins searching for a new channel at or below the desired noise floor level (step 316). If the average value AVG is below the $C_{THRESH}$ confidence level, the transceiver assumes that no better channels are available and maintains the current channel (step 308).

The constant value $C_{THRESH}$ is determined by calculating the minimum number of channels that must be available at a given noise level floor to ensure with a certain level of probability that at least one channel will be available at any given time at that noise floor level. In the example above, in which the network includes N=100 channels, the probability that a channel is idle at a given noise level equals the average (mean) number of channels idle at that noise level divided by 100. Therefore, according to the table in FIG. 4, the probability (p) of finding a channel with a noise floor of −87 dBm is 0.23 (p=0.23).

The actual number of available channels at any given moment is distributed binomially, with a mean Np and a variance Np(1−p). A transceiver must know only the mean number of available channels, as discussed above, to calculate the variance. When the variance Np(1−p) is much greater than one, the Gaussian distribution closely approximates a binomial distribution. Therefore, in a wireless communication network with many channels (e.g, N≧35), standard Gaussian statistics may be used to form a confidence test at the range of probabilities of interest. Using this test, the probability of finding a given number of idle channels at a given floor level with a given level of confidence in standard deviations (m) is determined by the following equation:

(given # of idle channels)=mean−(confidence level)·(standard deviation), or (given# of idle channels)=$N\cdot p - m\cdot\text{sqrt}\{Np(1-p)\}$.

For a 99.9% probability (m=3) that more than zero channels will be available, this equation reduces to:

$$0=N\cdot p_{thresh}-3\cdot\text{sqrt}\{N\cdot p_{thresh}(1-p_{thresh})\}.$$

Solving the equation 0=Np−3 sqrt{Np(1−p)} yields $P^0_{thresh}=m^2/(m^2+N)$. Therefore, in a 100-channel network, an average of at least eight channels (0.0826 of 100 channels) must be idle at a given noise floor level to ensure, with 99.9% probability, the availability of more than zero channels at any given time. The transmitting unit will store this number (eight in this example) as the constant value $C_{THRESH}$.

For a 99.9% probability that more than one channel will be available, the equation above reduces to:

$$1=N\cdot p_{thresh}-3\cdot\text{sqrt}\{N\cdot p_{thresh}(1-p_{thresh})\}, \text{ which yields}$$

$$p^1_{thresh}=\{m^2+2+\text{sqrt}\{(m^2+2)^2-4\ (N+m^2)/N\}\div\{2(N+m^2)\})$$

Therefore, in a 100 channel network, an average of at least ten channels (approximately 0.10 of 100 channels) must be idle at given noise floor level to ensure, with 99.9% probability, the availability of more than one channel at any given time.

A number of embodiments of the present invention have been described. Nevertheless, it will be understood that various modifications may be made without departing from the spirit and scope of the invention. For example, while the invention has been described in terms of a slotted TDMA/

TDD network, the invention may be implemented in networks using other communication technologies, including FDMA and FDD systems, as well as CDMA/TDD systems. In an FDMA or FDD system, the invention may be implemented by replacing time-domain elements described above with frequency-domain elements. The invention also can be implemented in asynchronous systems, i.e. systems in which the fixed stations are not synchronized with each other. Moreover, the invention may be implemented utilizing only discrete electronic components instead of the executable program described above. Accordingly, other embodiments are within the scope of the following claims.

What is claimed is:

1. A method for use in allowing a wireless transceiver communicating on one channel to seek another channel for communication, the method comprising:
    (a) monitoring available channels to determine whether any of the channels are idle,
    (b) accumulating data about the idle channels from which the transceiver can determine whether any of the channels are idle at any given time,
    (c) allowing the transceiver to determine whether any of the channels is idle and to seek another channel if the data indicates that the transceiver is likely to find an idle channel;
wherein the data about the idle channels is accumulated by the transceiver at times during which the transceiver can monitor other channels, and wherein allowing the transceiver to determine whether any of the channels is idle includes supplying at least some of the accumulated data to the transceiver at a time during which the transceiver cannot monitor other channels.

2. The method of claim 1, wherein allowing the transceiver to seek another channel comprises determining with a given level of confidence whether more than a given number of channels are likely to be idle.

3. The method of claim 2, wherein allowing the transceiver to seek another channel comprises determining with a 99.9% level of confidence whether more than zero channels are likely to be idle.

4. The method of claim 2, wherein allowing the transceiver to seek another channel comprises determining with a 99.9% level of confidence whether more than one channel is likely to be idle.

5. The method of claim 4, wherein monitoring the available channels comprises determining which of the channels has a noise floor level below a given threshold level.

6. The method of claim 5, wherein monitoring the available channels comprises determining, for each of multiple threshold levels, which of the channels has a noise floor level below the given threshold level.

7. The method of claim 6, wherein accumulating data comprises compiling information indicating, for each of the given threshold levels, how many of the channels have noise floor levels below the threshold level.

8. The method of claim 7, further comprising determining a minimum value for the average number of channels that ensures with a given level of confidence that more than a given number of the channels are idle at any given time.

9. The method of claim 8, wherein determining the minimum value comprises performing a Gaussian statistical analysis on the accumulated data.

10. A method for use in allowing a wireless transceiver communicating on one channel to seek another channel for communication, the method comprising:
    (a) monitoring available channels to determine whether any of the channels are idle,
    (b) accumulating data about the idle channels from which the transceiver can determine whether any of the channels are idle at any given time,
    (c) allowing the transceiver to determine whether any of the channels is idle and to seek another channel if the data indicates that the transceiver is likely to find an idle channel,
wherein accumulating data comprises compiling information indicating an average number of the channels over a given time period that have a noise floor level below the given threshold level.

11. The method of claim 10, wherein allowing the transceiver to seek another channel comprises determining whether the average number of channels is at least as great as the minimum value and allowing the transceiver to seek another channel only if so.

12. A wireless transceiver configured for communication on one channel comprising:
    (a) receiver circuitry configured to monitor other available channels to determine whether any of the channels are idle,
    (b) data accumulation circuitry configured to accumulate data about the idle channels from which the transceiver can determine whether any of the channels are idle at any given time, and
    (c) control circuitry configured to determine whether any of the channels is idle and to instruct the transceiver to seek another channel if the data indicates that the transceiver is likely to find an idle channel,
wherein the data accumulation circuitry accumulates the data about the idle channels at times during which the transceiver can monitor other channels, and wherein the control circuitry accesses the accumulated data at a time when the transceiver cannot monitor other channels to determine whether any of the channels is idle.

13. The transceiver of claim 12, wherein the control circuitry is configured to determine with a given level of confidence whether more than a given number of channels are likely to be idle before instructing the transceiver to seek another channel.

14. The transceiver of claim 13, wherein the control circuitry is configured to determine with a 99.9% level of confidence whether more than zero channels are likely to be idle before instructing the transceiver to seek another channel.

15. The transceiver of claim 13, wherein the control circuitry is configured to determine with a 99.9% level of confidence whether more than one channel is likely to be idle before instructing the transceiver to seek another channel.

16. The transceiver of claim 12, wherein the receiver circuitry is configured to determine which of the channels has a noise floor level below a given threshold level.

17. The transceiver of claim 16, wherein the receiver circuitry is configured to determine, for each of multiple threshold levels, which of the channels has a noise floor level below the given threshold level.

18. The transceiver of claim 17, wherein data accumulation circuitry is configured to compile information indicating, for each of the given threshold levels, how many of the channels have noise floor levels below the threshold level.

19. A wireless transceiver configured for communication on one channel comprising:
    (a) receiver circuitry configured to monitor other available channels to determine whether any of the channels are idle, (b) data accumulation circuitry configured to accumulate data about the idle channels from which the transceiver can determine whether any of the channels are idle at any given time, and (c) control circuitry configured to determine whether any of the channels is idle and to instruct the transceiver to seek another channel if the data indicates that the transceiver is likely to find an idle channel, wherein the data accumulation circuitry is configured to compile information indicating an average number of the channels over a given time period that have a noise floor level below the given threshold level.

20. The transceiver of claim 19, wherein the control circuitry is configured to determine a minimum value for the average number of channels that ensures with a given level of confidence that more than a given number of the channels are idle at any given time.

21. The transceiver of claim 20, wherein the control circuitry is configured to perform a Gaussian statistical analysis on the accumulated data to determine the minimum value.

22. The transceiver of claim 19, wherein the control circuitry is configured to determine whether the average number of channels is at least as great as the minimum value before instructing the transceiver to seek another channel.

* * * * *